US010303552B2

(12) United States Patent
Ramamurthi et al.

(10) Patent No.: US 10,303,552 B2
(45) Date of Patent: May 28, 2019

(54) METHOD FOR OPTIMIZING INDEX, MASTER DATABASE NODE AND SUBSCRIBER DATABASE NODE

(71) Applicant: Huawei Technologies Co., Ltd., Shenzhen (CN)

(72) Inventors: Prasanna Venkatesh Ramamurthi, Bangalore (IN); Vamsi Krishna, Bangalore (IN); Mahesh Kumar Behera, Bangalore (IN)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 15/158,279

(22) Filed: May 18, 2016

(65) Prior Publication Data
US 2016/0259692 A1 Sep. 8, 2016

Related U.S. Application Data

(63) Continuation of application No. PCT/CN2014/076612, filed on Apr. 30, 2014.

(30) Foreign Application Priority Data
Nov. 19, 2013 (IN) .......................... 5329/CHE/2013

(51) Int. Cl.
G06F 11/14 (2006.01)
G06F 16/22 (2019.01)
(Continued)

(52) U.S. Cl.
CPC ......... G06F 11/1451 (2013.01); G06F 16/22 (2019.01); G06F 16/2272 (2019.01);
(Continued)

(58) Field of Classification Search
CPC ......... G06F 17/30864; G06F 17/30654; G06F 17/30575; G06F 17/30289; G06F 7/02;
(Continued)

(56) References Cited

U.S. PATENT DOCUMENTS 6,167,405 A * 12/2000 Rosensteel, Jr. ........................... G06F 17/30592
7,467,163 B1 * 12/2008 Dodds ............... G06F 17/30318
(Continued)

FOREIGN PATENT DOCUMENTS

CN 102567464 A 7/2012
CN 102779185 A 11/2012
(Continued)

OTHER PUBLICATIONS

"Oracle GoldenGate," Windows and UNIX Administrator's Guide, 11g Release 2 (11.2.1.0.0) E27273-01, pp. 1-334 (Feb. 2012).
(Continued)

Primary Examiner — Angelica Ruiz
(74) Attorney, Agent, or Firm — Leydig, Voit & Mayer, Ltd.

(57) ABSTRACT

A method, a master database node and a subscriber database node for optimizing index. The method for optimizing index includes: checking, by a master database node, if role information of an index matches role information of the master database node, when the index is added into the master database node; updating database information by using the index when the role information of the index matches the role information of the master database node. In this invention, unnecessary indexes in the master database node and the subscriber database node are reduced while keeping the schema the same. Furthermore, unnecessary logs transmitted from the master database node to the subscriber database node are reduced.

17 Claims, 24 Drawing Sheets

(51) Int. Cl.
*G06F 16/23* (2019.01)
*G06F 16/27* (2019.01)

(52) U.S. Cl.
CPC .......... *G06F 16/27* (2019.01); *G06F 16/2358* (2019.01); *G06F 2201/80* (2013.01)

(58) Field of Classification Search
CPC ......... G06F 17/30312; G06F 17/30371; G06F 2201/80
See application file for complete search history.

(56) References Cited

U.S. PATENT DOCUMENTS

| | | | |
|---|---|---|---|
| 7,617,206 B1* | 11/2009 | Hu | G06F 17/30595 |
| 7,685,109 B1 | 3/2010 | Ransil et al. | |
| 2005/0055382 A1 | 3/2005 | Ferrat et al. | |
| 2007/0168400 A1 | 7/2007 | Lee et al. | |
| 2010/0161551 A1* | 6/2010 | Whynot | G06F 11/2094 |
| | | | 707/610 |
| 2011/0010344 A1 | 1/2011 | Sjogren | |
| 2011/0320404 A1 | 12/2011 | Akulavenkatavara et al. | |
| 2013/0332484 A1* | 12/2013 | Gajic | G06F 17/30286 |
| | | | 707/770 |
| 2016/0188690 A1* | 6/2016 | Tan | G06F 17/30345 |
| | | | 707/613 |

FOREIGN PATENT DOCUMENTS

| | | |
|---|---|---|
| CN | 103049554 A | 4/2013 |
| WO | WO 0016222 A1 | 3/2000 |
| WO | WO 2007037984 A2 | 4/2007 |
| WO | WO 2010073110 A1 | 7/2010 |

OTHER PUBLICATIONS

"Generate and Publish Scripts Wizard," https://technet.microsoft.com/en-us/library/bb895179(v=sql.110).aspx (Published no later than Jan. 22, 2017).

Cecchet et al., "Middleware-based Database Replication: The Gaps Between Theory and Practice," Proceedings of the ACM SIGMOD Conference, pp. 1-14, Vancouver, Canada (Jun. 2008).

"Publish Data and Database Objects," https://technet.microsoft.com/en-us/library/ms152559(v=sql.110).aspx (Published no later than Jan. 22, 2017).

Pochè, "Replicating Non-Clustered Indexes Improves Subscriber Query Performance," ReplTalk, http://blogs.msdn.com/b/repltalk/archive/2012/04/03/replicating-non-clustered-indexes-improves-subscriber-query-performance.aspx (Apr. 3, 2012).

"Replication (computing)," Wikipedia, https://en.wikipedia.org/wiki/Replication_(computing) (Published no later than Jan. 22, 2017).

"Allow materialized views that exist only on copy nodes," http://sqlanywhere-forum.sap.com/questions/947/allow-materialized-views-that-exist-only-on-copy-nodes (Aug. 2010).

* cited by examiner

METHOD FOR OPTIMIZING INDEX, MASTER DATABASE NODE AND SUBSCRIBER DATABASE NODE

CROSS-REFERENCE TO RELATED APPLICATIONS

This application is a continuation of International Patent Application No. PCT/CN2014/076612, filed on Apr. 30, 2014, which claims priority to Indian Patent Application No. IN5329/CHE/2013, filed on Nov. 19, 2013, both of which are hereby incorporated by reference in their entireties.

FIELD OF THE INVENTION

This application relates to database technology, in particular to a method for optimizing index, a master database node and a subscriber database node.

BACKGROUND

In a relational database, index is the most common way to speed-up a query to the database. The indexes are associated with tables. Once an index is associated with a table, the operation on the index (either a read or a write) is implicit. There is no need for the user to have the cognizance of an index.

For recovery and replication purpose, generally RDBMS generates a log which describes each operation. This log is known as a redo log or a transactional log or a simply log. In many cases this log is physical in nature. Whenever a write operation happens on the database, the log records this write operation. This is accomplished by the "log writer process". These logs include: the updates on the tables (the data segment) and the updates on the indexes associated with the tables (the index segments).

FIG. 1 is a schematic diagram showing an example of standard operation inside a RDBMS storage engine. As shown in FIG. 1, a simple table with two indexes is considered. When a record is inserted into the table, the database process will write to the data segment and the two index segments, while logs for each operation are generated.

On the other hand, for requirements of high availability (HA), load balancing databases use replication as a standard methodology. The most common form of replication implementation is "log shipping".

FIG. 2 is a schematic diagram showing an example of log shipping between a master database node and a subscriber database node. As shown in FIG. 2, in this solution, the designate master database node continuously ships its logs (such as redo logs) to the subscriber database node. The subscriber database node applies these logs on the database to synchronize with the master database node. The shipped logs include updates on the data segments and the index segments.

For purposes of seamless switch-over (or fail-over), it is desirable that the schemas in the master database node and the subscriber database node are kept the same. Most of HA systems in communication domain and enterprise domains use a master database node which is Read-Write and one or more subscriber database nodes which are Read-Only.

Nowadays, log shipping from the master database node to the subscriber database node is a normal feature for all database replications. Specialized replication solutions like GoldenGate (such as in Oracle) can synchronize databases in heterogeneous topologies. A similar solution is offered by using a translation middleware in [reference 1]. These solutions use logical replication based on SQL statements which are quite slow compared to the synchronization based on log shipping.

[Reference 2] has proposed an invention that: the data, which is shipped from the master database node, is re-interpreted in the subscriber database nodes semantically, and then is applied to the databases. This solution potentially can reduce the size of log which is being shipped from the master database node.

[Reference 3] has proposed an invention that: the master database node ships a log to a standby database node. The standby database node has a mapped table to the master DB's table (known as the federated table mapping). The change is applied to the federated table.

However, all the above said solutions have the following two weaknesses: (1) the re-interpretation is done in the subscriber database node and the master database node has no cognizance of this fact, which does not help to reduce the master's load; (2) as the two nodes are semantically not equal, switch-over is going to be very costly.

[Reference 4] offers an invention which can reduce the load of the master database node and the subscriber database nodes. This invention can also reduce the memory consumption on the master database node. In this innovation, the subscriber database node has a set of its own indexes which are generated by the subscriber database node on receiving the logs from the master database node. On switch-over these indexes are dropped by new master database node. This solution has the advantage of easy switch-over and memory optimization on the master database node.

However this solution has 3 issues: (1) it does not have a mechanism to reduce redundant indexes on the subscriber database nodes; (2) it requires the subscriber database node to identify which indexes need to be populated additionally, and which cannot be typically accomplished in the storage engine layer alone; (3) it puts the onus index creation on various nodes based on roles to the administrator.

[reference 1] "Middleware-based database replication: the gaps between theory and practice", Proceedings of the 2008 ACM SIGMOD international conference on Management of data, Pages 739-752.

[reference 2] WIPO Patent Application WO/2007/037984 (also U.S. Pat. No. 8,290,910), titled "SEMANTIC REPLICATION".

[reference 3] WIPO Patent Application WO/2010/073110, titled "SELECTIVE DATABASE REPLICATION".

[reference 4] US Patent Application 20110320404 titled "STANDBY INDEX IN PHYSICAL DATA REPLICATION".

SUMMARY

Embodiments of the present invention pertain to a method for optimizing index, a master database node and subscriber database node. The object of the invention is to reduce unnecessary indexes in the master database node and the subscriber database node while keeping the schema the same.

According a first aspect of the embodiments of the present invention, a method for optimizing index is provided, the method includes:

checking, by a master database node, if role information of an index matches role information of the master database node, when the index is added into the master database node; updating, by the master database node, database information by using the index when the role information of the index matches the role information of the master database node.

According another aspect of the embodiments of the present invention, wherein before checking if role information of an index matches role information of the master database node, the method further comprises:
adding the role information for the master database node.

According another aspect of the embodiments of the present invention, wherein before checking if role information of an index matches role information of the master database node, the method further comprises:
creating the index by using Data Definition Language;
updating the index with the role information.

According another aspect of the embodiments of the present invention, wherein the method further comprises:
checking, by the master database node, if the role information of the index matches the role information of a subscriber database node;
sending, by the master database node, the index to the subscriber database node when the role information of the index matches the role information of the subscriber database node, so as to synchronize the index with the subscriber database node.

According another aspect of the embodiments of the present invention, wherein the method further comprises:
receiving, by the master database node, the role information of the subscriber database node.

According another aspect of the embodiments of the present invention, wherein the method further comprises:
checking, by the master database node, if the role information of the index matches the role information of the master database node, when a record need to be inserted into a table associated with the index;
generating dummy redo information for the record when the role information of the index does not match the role information of the master database node.

According another aspect of the embodiments of the present invention, wherein the method further comprises:
checking, by the master database node, if the role information of the index matches the role information of a subscriber database node;
sending, by the master database node, the dummy redo information to the subscriber database node when the role information of the index matches the role information of the subscriber database node.

According another aspect of the embodiments of the present invention, wherein when the role information of the index matches the role information of the master database node, the method further comprises:
inserting, by the master database node, the record into the table associated with the index; generating redo information for the record.

According another aspect of the embodiments of the present invention, wherein the method further comprises:
checking, by the master database node, if the role information of the index matches the role information of a subscriber database node;
sending, by the master database node, the redo information to the subscriber database node when the role information of the index matches the role information of the subscriber database node.

According another aspect of the embodiments of the present invention, wherein the method further comprises:
checking, by the master database node, if the role information of the index matches updated role information of the master database node, when the role information of the master database node is updated;
populating, by the master database node, the index when the role information of the index matches the updated role information of the master database node.

According a second aspect of the embodiments of the present invention, a method for optimizing index is provided, comprising:
updating, by a subscriber database node, role information of the subscriber database node when the subscriber database node is added into a cluster containing a master database node;
sending, by the subscriber database node, the role information of the subscriber database node to the master database node.

According another aspect of the embodiments of the present invention, wherein the method further comprises:
receiving, by the subscriber database node, an index from the master database node; synchronizing the index with the master database node.

According another aspect of the embodiments of the present invention, wherein the method further comprises:
receiving, by the subscriber database node, redo information from the master database node; updating relevant segment based on the redo information, when the redo information is index redo information.

According another aspect of the embodiments of the present invention, wherein the method further comprises:
updating the index with the redo information, when the redo information is not index redo information and not dummy redo information.

According another aspect of the embodiments of the present invention, wherein the method further comprises:
generating index data and updating the index according to the redo information, when the redo information is not index redo information and is dummy redo information.

According another aspect of the embodiments of the present invention, wherein the method further comprises:
checking, by the subscriber database node, if the role information of the index matches updated role information of the subscriber database node, when the role information of the subscriber database node is updated;
populating, by the subscriber database node, the index when the role information of the index matches the updated role information of the subscriber database node.

According another aspect of the embodiments of the present invention, wherein the method further comprises:
truncating, by the subscriber database node, the index when the role information of the index does not match the updated role information of the subscriber database node.

According a third aspect of the embodiments of the present invention, a master database node is provided, comprising:
a first checking unit, configured to check if role information of an index matches role information of the master database node, when the index is added into the master database node;
a first updating unit, configured to update database information by using the index when the role information of the index matches the role information of the master database node.

According another aspect of the embodiments of the present invention, wherein the master database node further comprises:
a first adding unit, configured to add the role information for the master database node.

According another aspect of the embodiments of the present invention, wherein the master database node further comprises:

a first creating unit, configured to create the index by using Data Definition Language;
a second updating unit, configured to update the index with the role information.

According another aspect of the embodiments of the present invention, wherein the master database node further comprises:
a second checking unit, configured to check if the role information of the index matches the role information of a subscriber database node;
a first sending unit, configured to send the index to the subscriber database node when the role information of the index matches the role information of the subscriber database node, so as to synchronize the index with the subscriber database node.

According another aspect of the embodiments of the present invention, wherein the master database node further comprises:
a first receiving unit, configured to receive the role information of the subscriber database node.

According another aspect of the embodiments of the present invention, wherein the master database node further comprises:
a third checking unit, configured to check if the role information of the index matches the role information of the master database node, when a record need to be inserted into a table associated with the index;
a first generating unit, configured to generate dummy redo information for the record when the role information of the index does not match the role information of the master database node.

According another aspect of the embodiments of the present invention, wherein the master database node further comprises:
a fourth checking unit, configured to check if the role information of the index matches the role information of a subscriber database node;
a second sending unit, configured to send the dummy redo information to the subscriber database node when the role information of the index matches the role information of the subscriber database node.

According another aspect of the embodiments of the present invention, wherein the master database node further comprises:
a first inserting unit, configured to insert the record into the table associated with the index;
a second generating unit, configured to generate redo information for the record.

According another aspect of the embodiments of the present invention, wherein the master database node further comprises:
a fifth checking unit, configured to check if the role information of the index matches the role information of a subscriber database node;
a third sending unit, configured to send the redo information to the subscriber database node when the role information of the index matches the role information of the subscriber database node.

According another aspect of the embodiments of the present invention, wherein the master database node further comprises:
a sixth checking unit, configured to check if the role information of the index matches updated role information of the master database node, when the role information of the master database node is updated;
a first populating unit, configured to populate the index when the role information of the index matches the updated role information of the master database node.

According a fourth aspect of the embodiments of the present invention, a subscriber database node is provided, comprising:
a third updating unit, configured to update role information of the subscriber database node when the subscriber database node is added into a cluster containing a master database node;
a fourth sending unit, configured to send the role information of the subscriber database node to the master database node.

According another aspect of the embodiments of the present invention, wherein the subscriber database node further comprises:
a second receiving unit, configured to receive an index from the master database node;
a synchronizing unit, configured to synchronize the index with the master database node.

According another aspect of the embodiments of the present invention, wherein the subscriber database node further comprises:
a third receiving unit, configured to receive redo information from the master database node;
a fourth updating unit, configured to update relevant segment based on the redo information, when the redo information is index redo information.

According another aspect of the embodiments of the present invention, wherein the subscriber database node further comprises:
a fifth updating unit, configured to update the index with the redo information, when the redo information is not index redo information and not dummy redo information.

According another aspect of the embodiments of the present invention, wherein the subscriber database node further comprises:
a second generating unit, configured to generate index data and update the index according to the redo information, when the redo information is not index redo information and is dummy redo information.

According another aspect of the embodiments of the present invention, wherein the subscriber database node further comprises:
a seventh checking unit, configured to check if the role information of the index matches updated role information of the subscriber database node, when the role information of the subscriber database node is updated;
a second populating unit, configured to populate the index when the role information of the index matches the updated role information of the subscriber database node.

According another aspect of the embodiments of the present invention, wherein the subscriber database node further comprises:
a truncating unit, configured to truncate the index when the role information of the index does not match the updated role information of the subscriber database node.

The advantages of the present invention exist in that: indexes are associated with role information, while role information is associated with the master database node and the subscriber database node. In this invention, unnecessary indexes in the master database node and the subscriber database node are reduced while keeping the schema the same. Furthermore, unnecessary logs transmitted from the master database node to the subscriber database node are reduced.

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated in size, e.g., made larger in relation to other parts than in an exemplary device actually made according to the invention. Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

BRIEF DESCRIPTION OF THE DRAWING

The drawings are included to provide further understanding of the present invention, which constitute a part of the specification and illustrate the embodiments of the present invention, and are used for setting forth the principles of the present invention together with the description. The same element is represented with the same reference number throughout the drawings.

In the drawings.

DETAILED DESCRIPTION

The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

Figure 1:
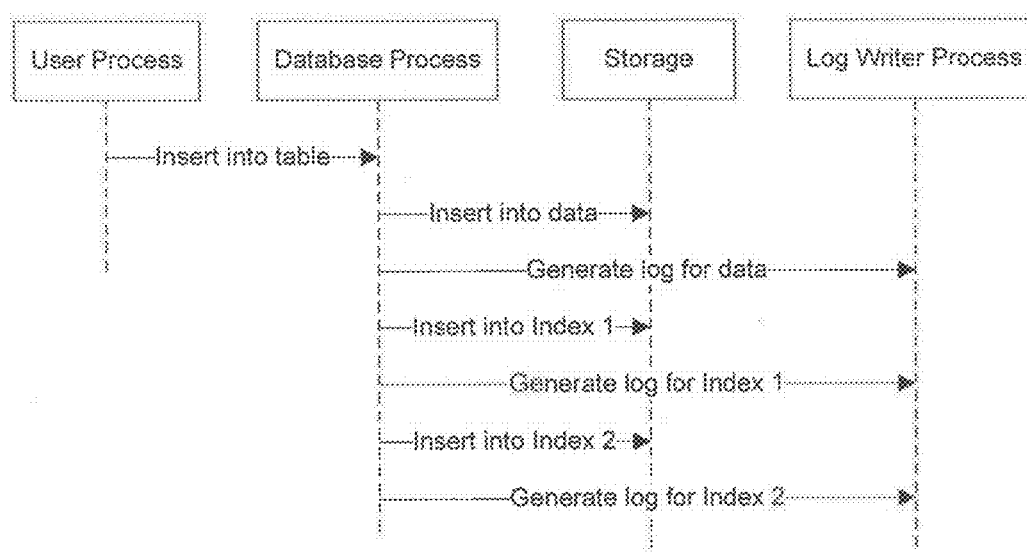
FIG. 1 is a schematic diagram showing an example of standard operation inside a RDBMS storage engine.
Figure 2:
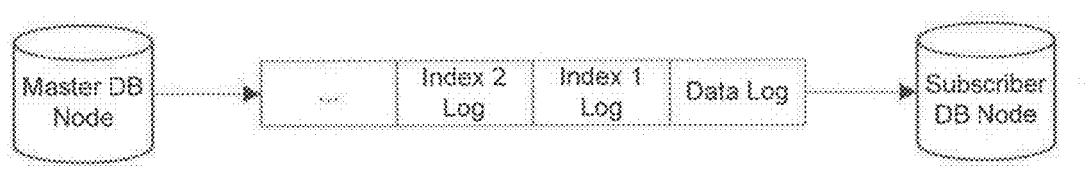
FIG. 2 is a schematic diagram showing an example of log shipping between a master database node and a subscriber database node.
Figure 3:
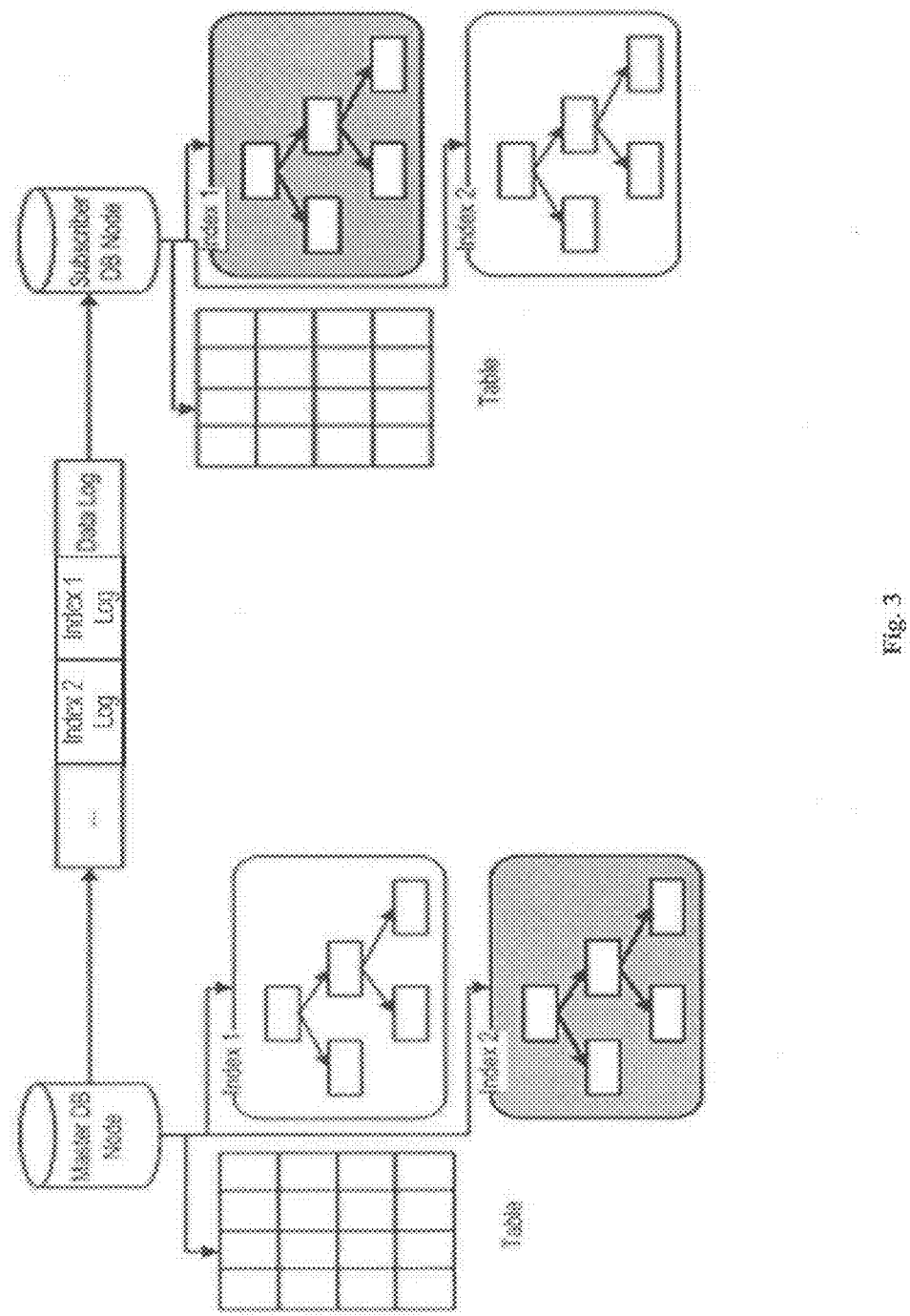
FIG. 3 is a schematic diagram showing an example of indexes used in a master database node and a subscriber database node.

FIG. 3 is a schematic diagram showing an example of indexes used in a master database node and a subscriber database node. As shown in FIG. 3, databases with a table and two indexes associated with the table are considered.

Assume that the master database node is primarily used for write and it only uses index-1, and the subscriber database node is read-only and it only uses index-2.

As shown in FIG. 3, the items marked in dark are unnecessary. The prior art suffers from the following few or all issues: unnecessary logs are shipped to the subscriber database nodes and applied; the master database node is required to generate redo-logs for unnecessary indexes, which causes reduced availability of the master database node; the master database node and the subscriber database node are required to maintain unnecessary indexes costing additional memory; the master database node and the subscriber database node do not share the same schema whereby switch-over is very costly; the master database node is not aware of the schema of the subscriber database node, such that the cluster topology is very complex; the replication optimization cannot be performed trivially by the storage engine alone.

In order to overcome the above mentioned deficiencies, there is a proposed solution of selective maintenance of index information. The embodiments of the present invention are described as follows in reference to the drawings.

Embodiment 1

This embodiment of the present invention provides a method for method for optimizing index, applied in a master database node.

Figure 4:
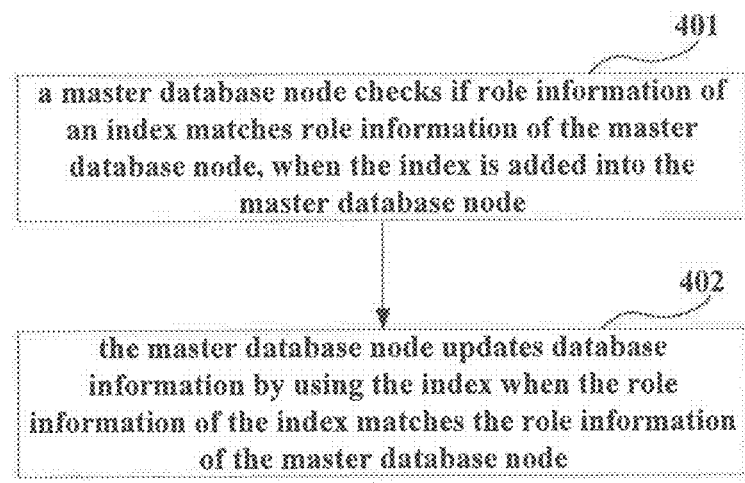
FIG. 4 is a flowchart of the method for optimizing index in accordance with an embodiment of the present invention.

FIG. 4 is a flowchart of the method for optimizing index in accordance with an embodiment of the present invention; as shown in FIG. 4, the method includes:

Step 401, a master database node checks if role information of an index matches role information of the master database node, when the index is added into the master database node;

Step 402, the master database node updates database information by using the index when the role information of the index matches the role information of the master database node.

In this embodiment, an index, which is created on the master database node, is assigned a corresponding role based on its primary usage. The index could be termed a read-aid index or a write-aid index. This characteristic determines nature of replication for this index.

In this embodiment, the characteristic of the index is mapped to the assigned characteristic of the master database node. Only if the attribute is mapped, the index will exist on the given node.

Figure 5:
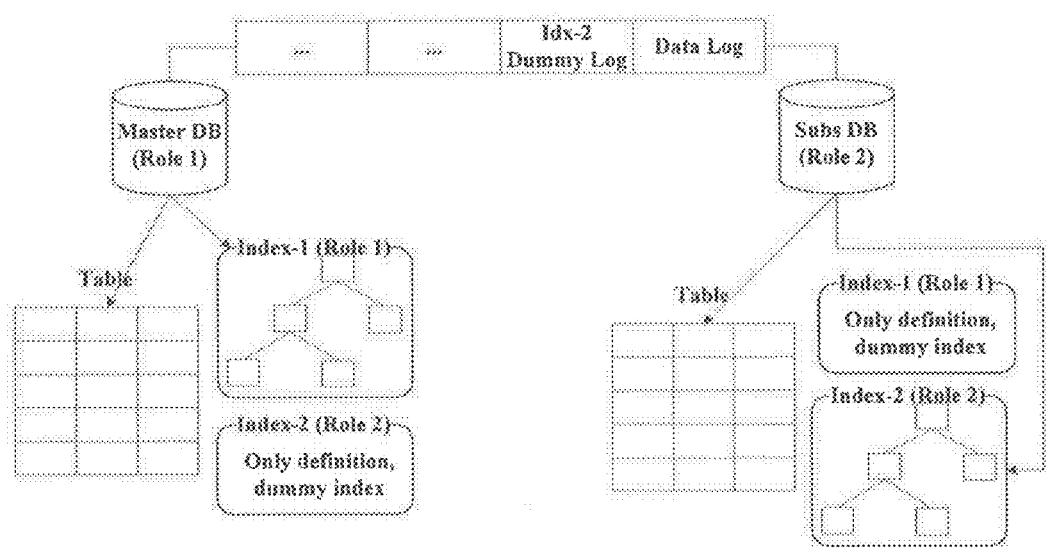
FIG. 5 is a schematic diagram showing an example of indexes used in a master database node and a subscriber database node.

FIG. 5 is a schematic diagram showing an example of indexes used in a master database node and a subscriber database node. As shown in FIG. 5, for example, Index-1 is designated as a "Role-1" index and the Index-2 is designated as a "Role-2" index.

As shown in FIG. 5, the master database node, which is designated as a "Role-1" node, ships only the data but not the Index-1 to the subscriber database node. Furthermore, the master database node does not insert any information into Index-2 which is a "Role-2" index.

In practically, Role-1 could be "Write-Only" and the associated index could be a "write-aid" index. Similarly Role-2 could be "Read-Only" and the associated index could be a "read-aid" index.

Figure 6:
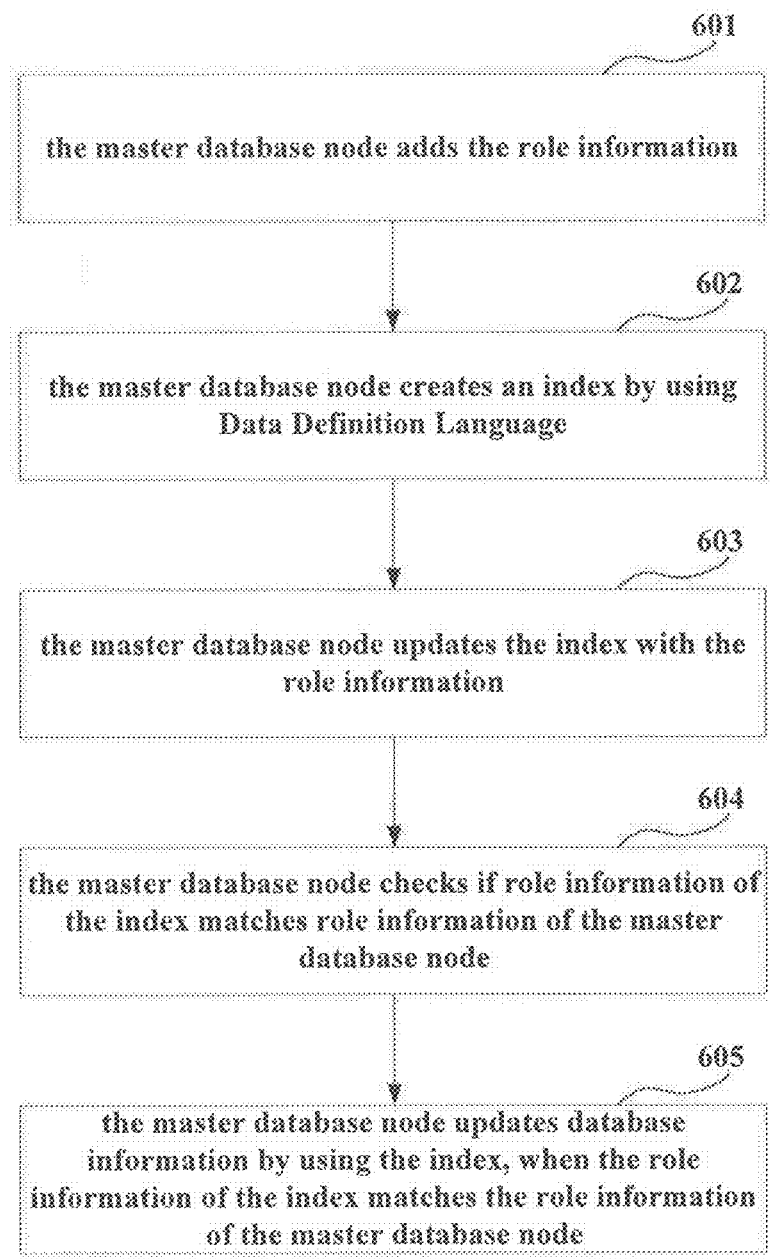
FIG. 6 is another flowchart of the method for optimizing index in accordance with an embodiment of the present invention.

FIG. 6 is another flowchart of the method for optimizing index in accordance with an embodiment of the present invention; as shown in FIG. 6, the method includes:

Step 601, the master database node adds the role information;

Step 602, the master database node creates an index by using Data Definition Language (DDL);

Step 603, the master database node updates the index with the role information;

Step 604, the master database node checks if role information of the index matches role information of the master database node;

Step 605, the master database node updates database information by using the index, when the role information of the index matches the role information of the master database node.

In this embodiment, telecom systems use multiple copies of the same database to achieve high availability. But many times the same copy of the database is used for different service purposes. Hence along with the usage of a standby database (subscriber database node) for redundancy, the standby database could be used for multiple service reasons. For example, a standby database may be configured to handle basic call operations. In this case it requires only information about the phone numbers and mutes. Another standby database may be used for billing information like bill-plan data, per-minute billing. These services can be considered as different "roles" of the database.

Different services of the database will require different indexes to optimize the processing. Hence indexes also can be assigned a "role". Grouping a set of indexes under a "role" and also tagging a subscriber database node with a role can help to synchronize only relevant information to the subscriber database node and also to store only relevant information in the master database node. The database software is enhanced with storage space for roles. The catalog or system tables have a field role enabled.

Table 1 has shown system table definitions. As shown in table 1, the system tables have the subscriber information and the Index information added with the "Role ID" field.

TABLE 1

| SysSubscribers | | | |
| --- | --- | --- | --- |
| SubID | IP | Port | Role ID |
| SysIndex | | | |
| IndexID | Idx Name | Table | — | Role ID |

In another embodiment, multiple roles could be assigned per index. Also multiple roles could be assigned per subscribers. Table 2 has shown other system table definitions. As shown in table 2, multiple roles could be assigned for index or subscriber database node.

TABLE 2

| SysSubscribers | | | |
| --- | --- | --- | --- |
| SubID | IP | Port | Role ID |
| | | | R1 | R2 | ... | Rn |

| SysIndex | | | | |
| --- | --- | --- | --- | --- |
| IndexID | Idx Name | Table | ... | Role ID |
| | | | | R1 | R2 | ... | Rn |

Furthermore, there could be also a pre-defined set of roles. For example, the roles could be typically the role of "read-only" and "primarily-write" for nodes. The roles also could be typically the role of "read-aid" and "write-aid" for indexes In this embodiment, a special catalog (system) table may be introduced to handle the roles defined in the master database node. The structure of this system table (SysRoles) is shown in the following table 3.

TABLE 3

SysRoles Schema

| RoleID | Subss | Indexes | Role Name |
|--------|-------|---------|-----------|
|        |       | 11 | 12 | ... | 13 |
|        | S1 | S2 | ... | Sn |

To make the search and other optimizations, the indexes corresponding to a given role and subscribers corresponding to a given role are also tracked in this system table.

Figure 7:
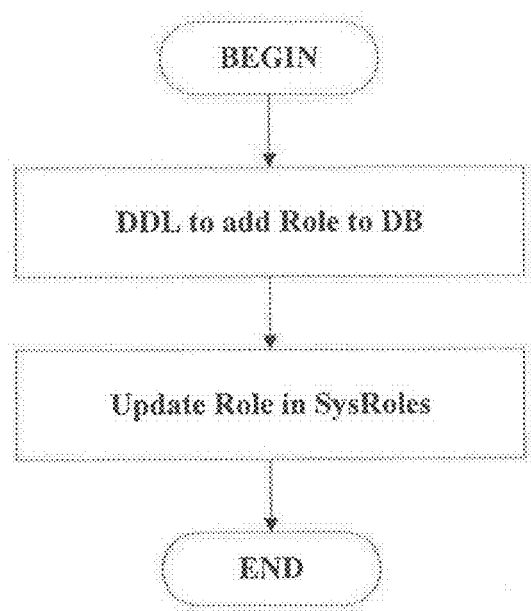
FIG. 7 is a schematic diagram showing an example of adding a role in the master database node.

In step 601, a role can be added to the database through a special DDL command or by configuration in the master database node. Once a role is added to the master DB, this data is placed in the "SysRoles" table. FIG. 7 is a schematic diagram showing an example of adding a role in the master database node.

In step 602 and 603, the master database node is assigned a role which it uses to ensure only the relevant indexes are stored in the master database node. Index related DDL are enhanced to support "role" as a parameter in a fashion similar to the following two examples:

1. CREATE INDEX idx1 ON table1 (col1) WITH ROLE role1
2. ALTER INDEX idx1 SET ROLE role1

In step 604 and 605, when an index is added to the master database node, the master database node will check if the role is configured in the database. If the role is not configured, or if the role is not mentioned in an index, the default role assigned is "ALL". After verification of the role, the master database node places this index information in the SysRoles table.

Figure 8:
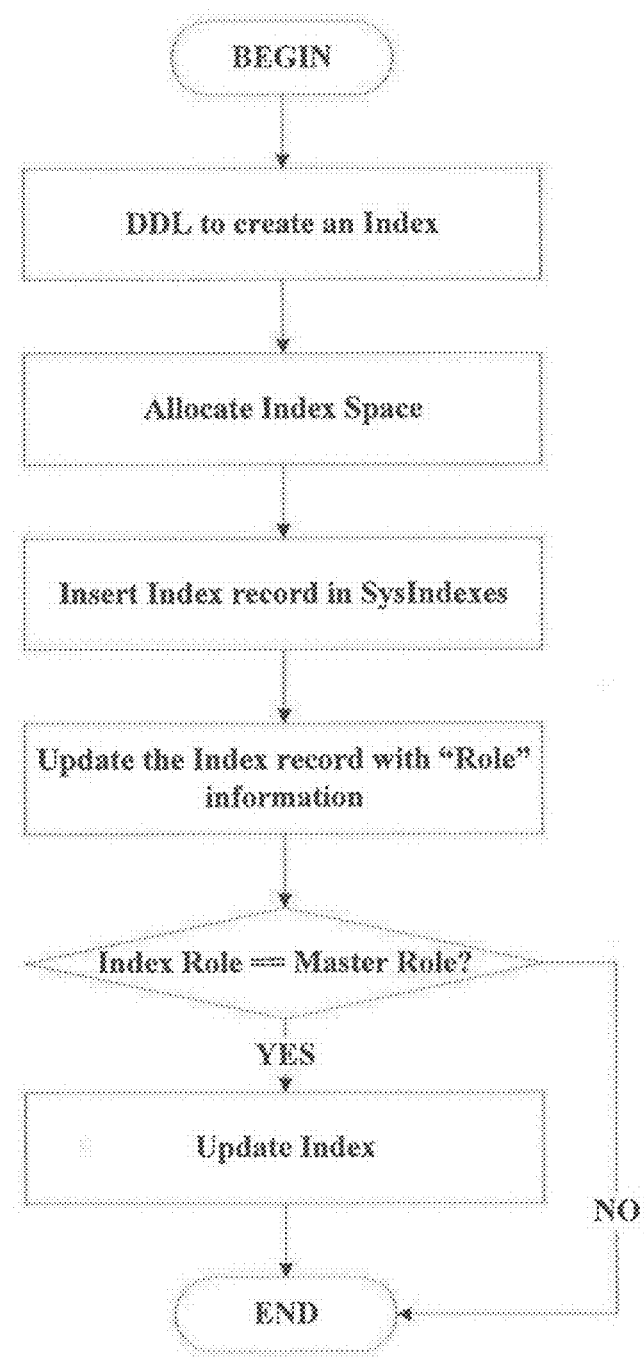
FIG. 8 is a schematic diagram showing an example of adding an index in the master database node.

Then the master database node checks if its own role corresponds to the index's role. If the role matches, the master populates this index field. FIG. 8 is a schematic diagram showing an example of adding an index in the master database node.

The above embodiment has described that: indexes are associated with role information, while role information is associated with the master database node and the subscriber database node. In this embodiment, unnecessary indexes in the master database node and the subscriber database node are reduced while keeping the schema the same.

In another embodiment, indexes associated with role information are shipped to the subscriber database node from the master database node. In this embodiment, unnecessary logs transmitted from the master database node to the subscriber database node are reduced.

Figure 9:
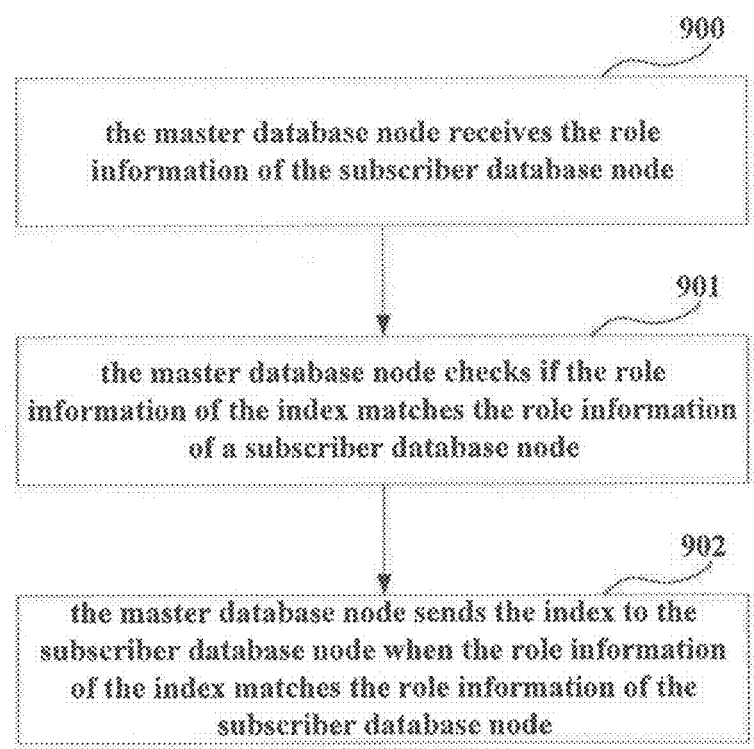
FIG. 9 is another flowchart of the method for optimizing index in accordance with an embodiment of the present invention.

FIG. 9 is another flowchart of the method for optimizing index in accordance with an embodiment of the present invention; as shown in FIG. 9, the method includes:
Step 901, the master database node checks if the role information of the index matches the role information of a subscriber database node;
Step 902, the master database node sends the index to the subscriber database node when the role information of the index matches the role information of the subscriber database node, so as to synchronize the index with the subscriber database node.

As shown in FIG. 9, the method may further include:
Step 900, the master database node receives the role information of the subscriber database node.

Figure 10:
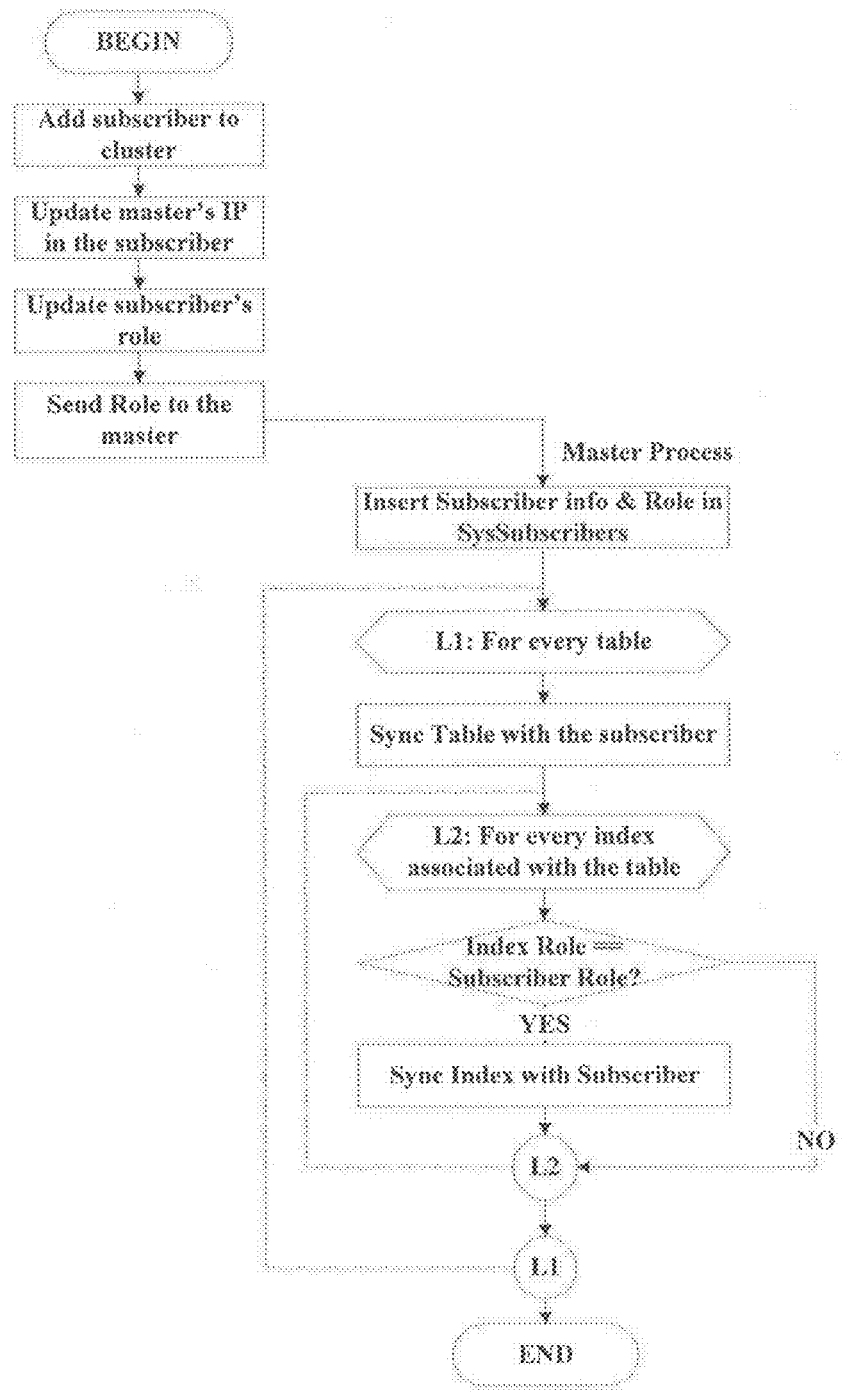
FIG. 10 is a schematic diagram showing an example of adding a subscriber database node to a cluster.

FIG. 10 is a schematic diagram showing an example of adding a subscriber database node to a cluster. As shown in FIG. 10, when a subscriber database node is added to the cluster, the subscriber database node publishes the "role" to the master database node.

As shown in FIG. 10, the master database node records this information in the SysSubscribers table. Based on the role, the master database node replicates only the relevant information to the subscriber database node. This is done by iterating through all the indexes and checking if the role of the subscriber database node matches the role of the index. If it matches, the master database node synchronizes the data with the subscriber database node.

In another embodiment, a record need to be inserted into a table associated with the index. In this embodiment, the master database node tracks the amount of work required to complete before the logs could be shipped to the subscriber database node.

After finishing this work, the logs are shipped. If there is some more work, which is typically to update an index which is relevant to the master, it continues to do this work. This reduces the latency of the synchronization of data between the subscriber database node and the master database node. This makes the master database node and subscriber database node more real-time synchronized.

Figure 11:
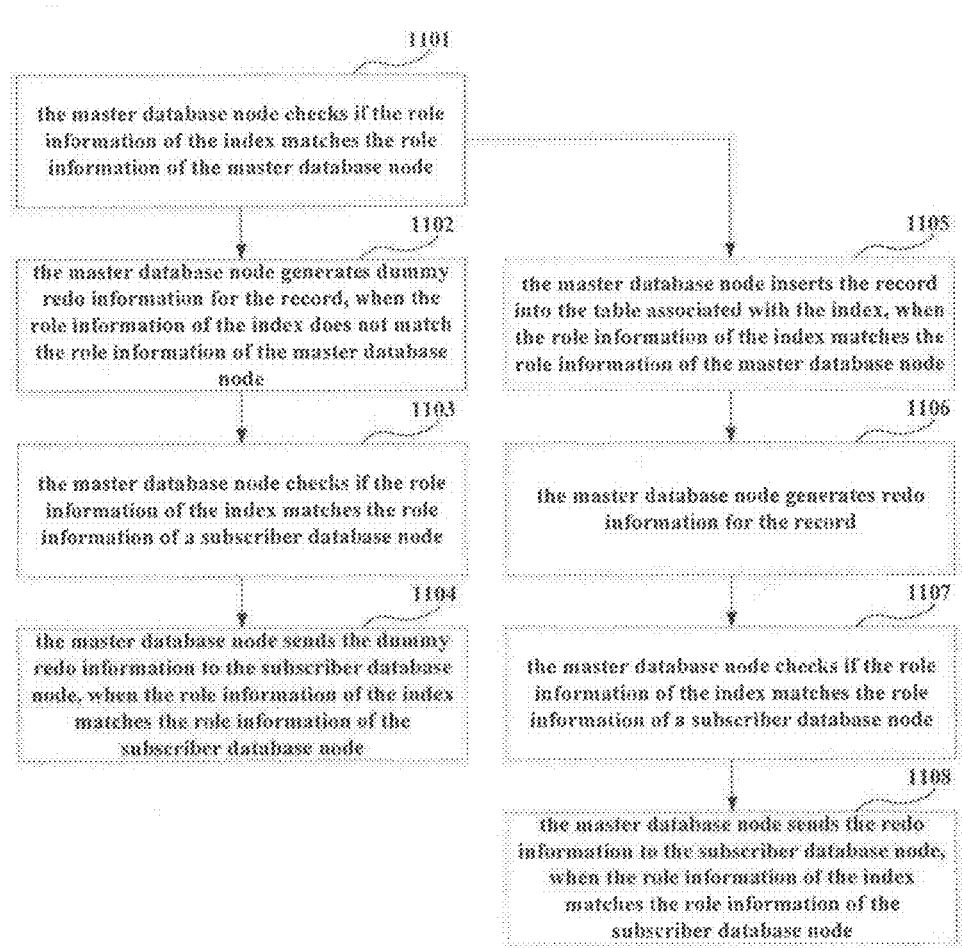
FIG. 11 is another flowchart of the method for optimizing index in accordance with an embodiment of the present invention.

FIG. 11 is another flowchart of the method for optimizing index in accordance with an embodiment of the present invention; as shown in FIG. 11, the method includes:
Step 1101, the master database node checks if the role information of the index matches the role information of the master database node;
Step 1102, the master database node generates dummy redo information for the record, when the role information of the index does not match the role information of the master database node.

As shown in FIG. 11, the method may further include:
Step 1103, the master database node checks if the role information of the index matches the role information of a subscriber database node;
Step 1104, the master database node sends the dummy redo information to the subscriber database node, when the role information of the index matches the role information of the subscriber database node.

As shown in FIG. 11, when the role information of the index matches the role information of the master database node, the method may further include:
Step 1105, the master database node inserts the record into the table associated with the index;
Step 1106, the master database node generates redo information for the record.

As shown in FIG. 11, the method may further include:
Step 1107, the master database node checks if the role information of the index matches the role information of a subscriber database node;
Step 1108, the master database node sends the redo information to the subscriber database node, when the role information of the index matches the role information of the subscriber database node.

Figure 12:
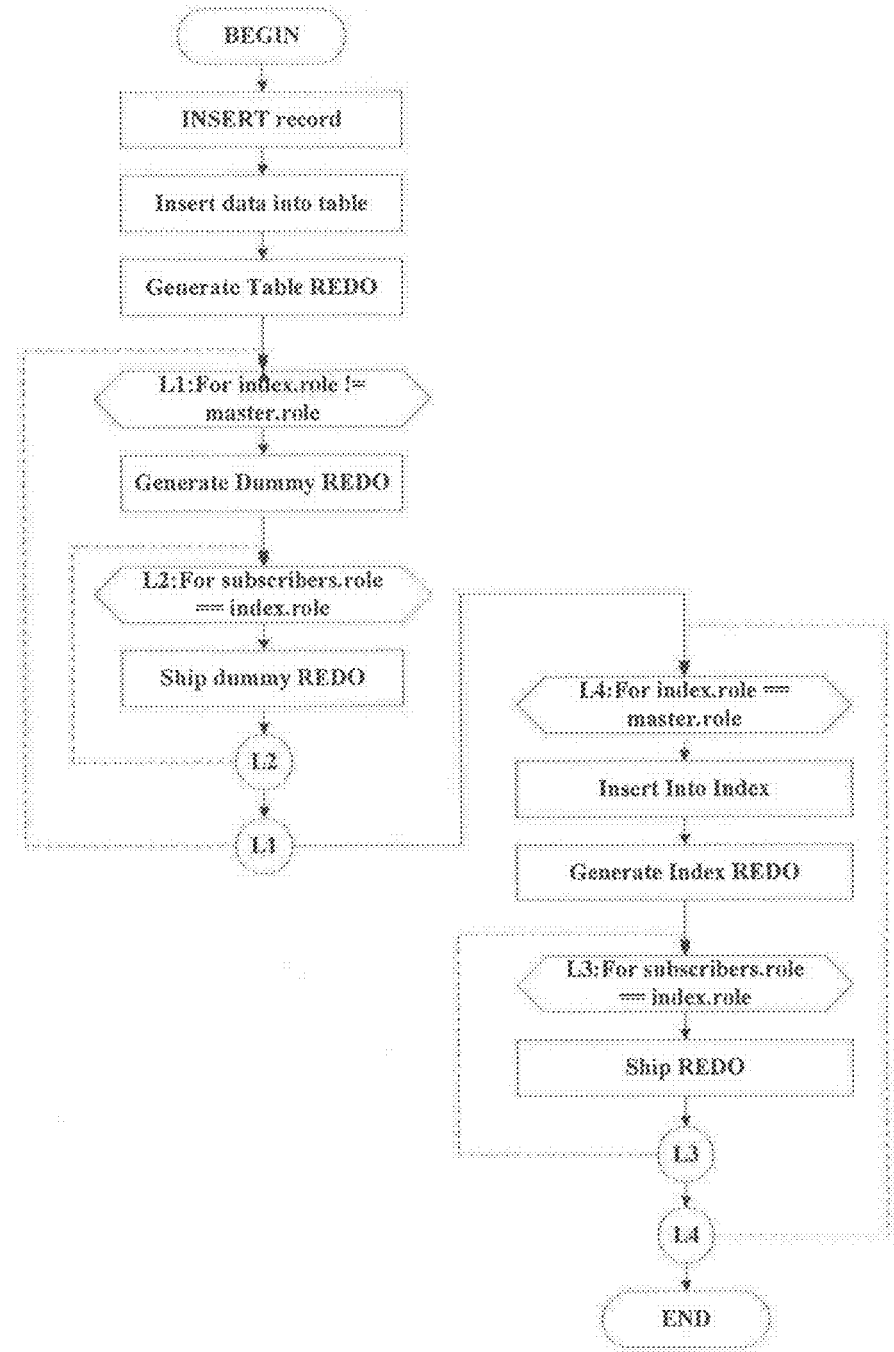
FIG. 12 is a schematic diagram showing an example of insert operation in the master database node.

FIG. 12 is a schematic diagram showing an example of insert operation in the master database node. As shown in FIG. 12, when a record is inserted in the master database node, the master database node inserts the record in the relevant table. A redo is generated for this insert operation of table.

Then the master database node iterates through the list of indexes associated with the table. The master database node first generates "dummy REDO" for all associated indexes. The dummy REDO is generated with the role of the index and the master does not match. Then the "dummy REDO" is shipped to the subscriber database node, if the role of the subscriber database node matches that of the role of the index for which the "dummy REDO" was generated.

Then the master database node proceeds to insert data into all the indexes whose role matches that of the master database node. REDO logs are generated for these indexes and then shipped to the subscriber database nodes whose role matches the indexes.

In another embodiment, role information of the master database node may be updated.

Figure 13:
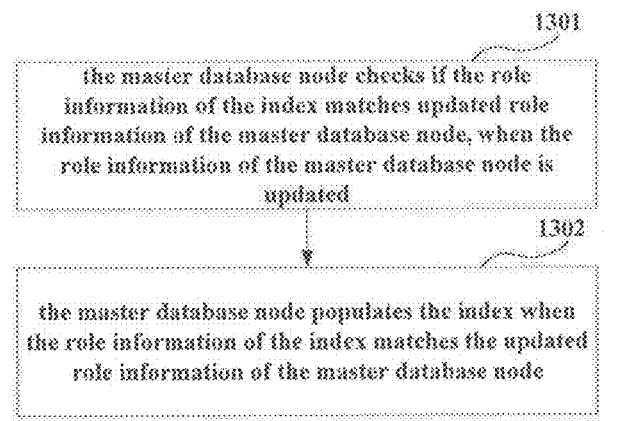
FIG. 13 is another flowchart of the method for optimizing index in accordance with an embodiment of the present invention.

FIG. 13 is another flowchart of the method for optimizing index in accordance with an embodiment of the present invention; as shown in FIG. 13, the method includes:

Step 1301, the master database node checks if the role information of the index matches updated role information of the master database node, when the role information of the master database node is updated;

Step 1302, the master database node populates the index when the role information of the index matches the updated role information of the master database node.

In this embodiment, when a fail-over or a switch-over happens, a new master database node obtains the master's role from a persistent entity which could be a cluster manager or other servers. It can obtain this default role from a configuration file or also from a well-known location. Based on this new role, the master database node will update its indexes.

In another embodiment, the "role" of the subscriber database node could be used as a policy parameter for cluster switch-over and management. The role parameter could be used to determine the priority of replication from the master database node.

For example, the reporting role could be inferior to a sales role. Accordingly the nodes having the "sale role" could get the priority in the replication and also could be prioritized to take over as the master during a switch-over.

There are some application scenarios for this invention. However, it is not limited thereto, and particular implement way may be determined as actually required.

Figure 14:
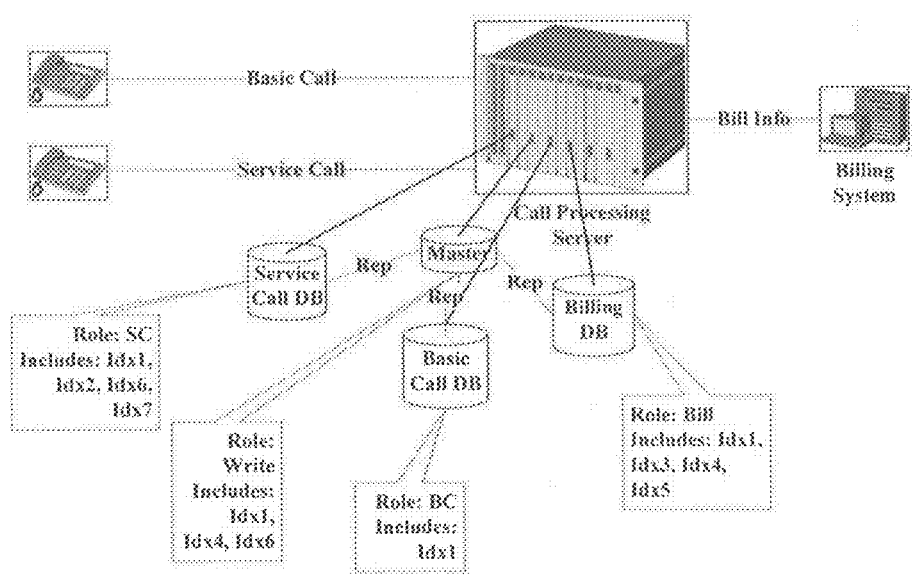
FIG. 14 is a schematic diagram showing an example of application scenario 1.
Figure 15:
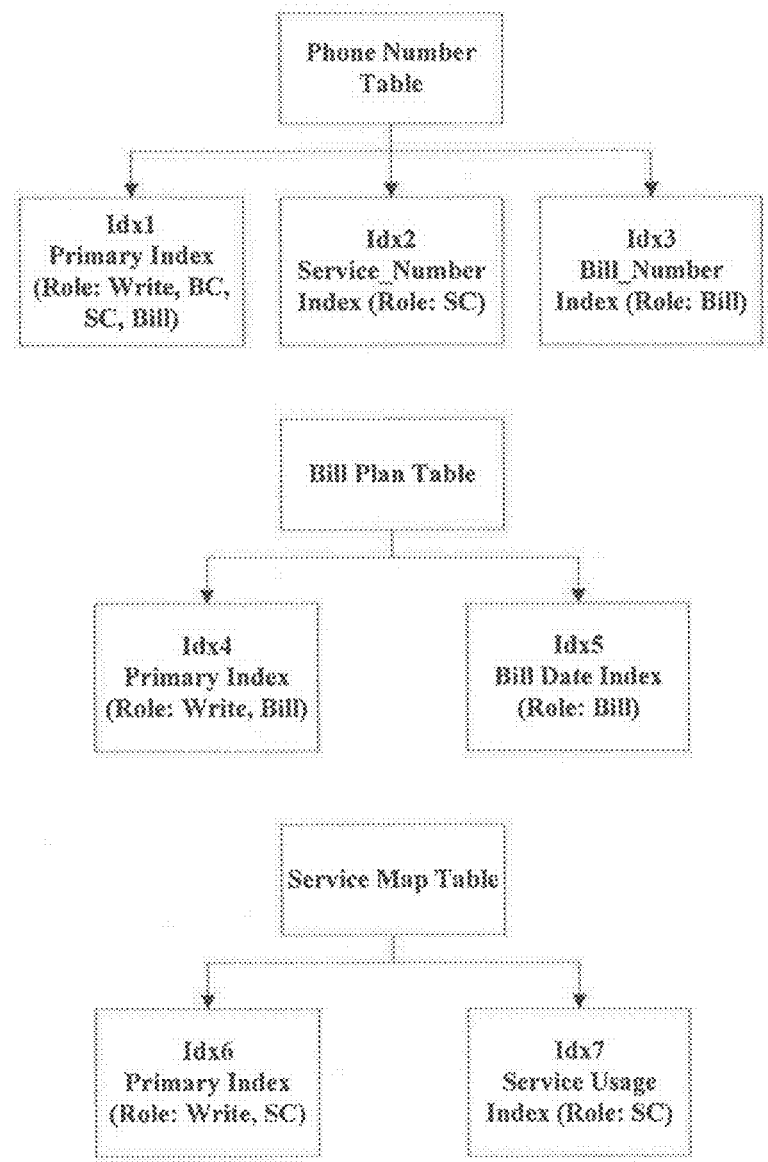
FIG. 15 is a schematic diagram showing an example of tables and indexes information of the scenario 1.

FIG. 14 is a schematic diagram showing an example of application scenario 1; FIG. 15 is a schematic diagram showing an example of tables and indexes information of the scenario 1.

As shown in FIG. 15, the schema is one sample schema for a call processing entity. The call processing entity could be a soft switch or a telecom switch.

As shown in FIG. 14, in the scenario for a call processing entity like a telecom switch, there are functionalities to handle basic voice calls, value added service calls and also to handle billing systems.

In this scenario, the base data on which they operate are same. However the views which are used to operate are quite different. For example, a single table could contain all the information about the billing, service subscription and number routing details. The billing information may not be required by any entity other than the service call processing entity.

In this scenario, the database deployment is optimized by engaging different indexes for different entities. This has an advantage of reducing the memory usage and at the same time the DBs can be used for HA.

Figure 16:
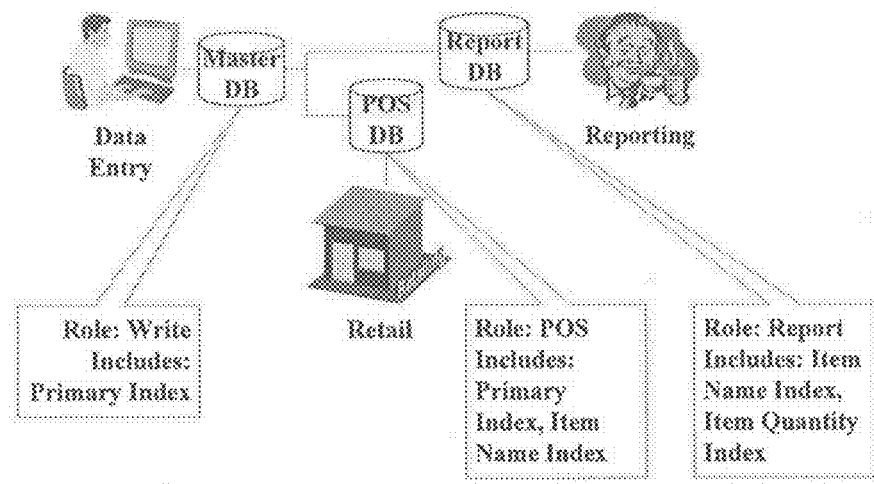
FIG. 16 is a schematic diagram showing an example of application scenario 2.
Figure 17:
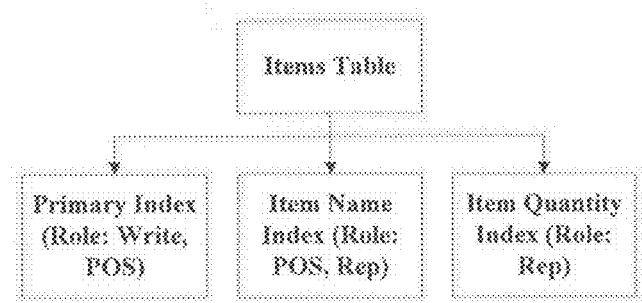
FIG. 17 is a schematic diagram showing an example of table and indexes information of the scenario 2.

FIG. 16 is a schematic diagram showing an example of application scenario 2; FIG. 17 is a schematic diagram showing an example of table and indexes information of the scenario 2.

As shown in FIG. 17, the schema is one sample schema for a simple items management entity. There is one table which contains the items information. The table contains 3 indexes focused on Item ID, Item Name and Item Quantity.

As shown in FIG. 16, In the scenario there are 3 entities which use the replicated database. There is one entity the data-entry operation. This entity is tagged with the supply-chain and also for price control. The items information is entered into this system. This acts as a master database for the cluster.

There are various stores which use this items table for shopping. This entity can be called the POS (point-of-sale) entity. There is another entity which is a reporting entity. The different entities are interested in different aspects of the schema. This leads us to have differential index for the tables.

For example, an index on the "Item Name" is more required on a POS where the customers enquire about the availability and price of a given item by name. While a reporting entity may query for all goods which have gone below a specific quantity level, so requires a index on the quantity.

In this scenario role-based index serves as a good performance and memory improvement measure.

Figure 18:
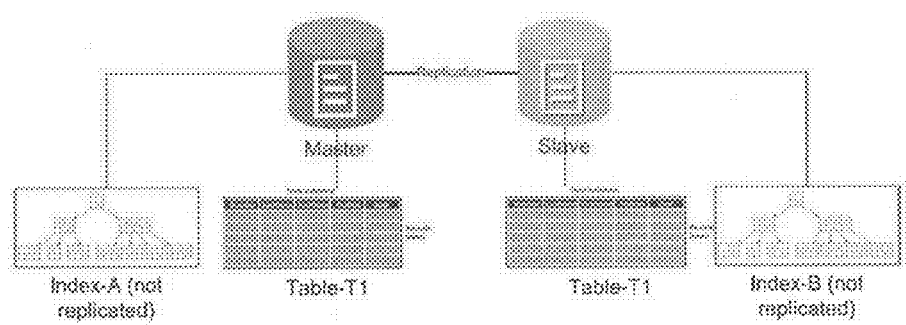
FIG. 18 is a schematic diagram showing an example of application scenario 3.

FIG. 18 is a schematic diagram showing an example of application scenario 3. In the simple scenario, network load reduced by about 65% (1 redo in place of 3 redo); space occupancy reduced by about 10% on master & slave; Master's availability increased by 65% for insert, delete.

It can be seen from the above embodiment that: network traffic will be reduced and hence the bandwidth is effectively utilized; latency is reduced in the master and slaves because of reduced replay/redo generation; memory is effectively utilized as segment/space for index is allocated, only if the role of the index is matched with the role of the node; schema is maintained the same in master and slaves, so switch-over is smooth; the differential indexes are online-created, which reduces service disruption on switch-over.

Embodiment 2

This embodiment of the present invention provides a method for method for optimizing index, applied in a subscriber database node. This embodiment corresponds to the above embodiment 1, and the same content will not be described.

Figure 19:
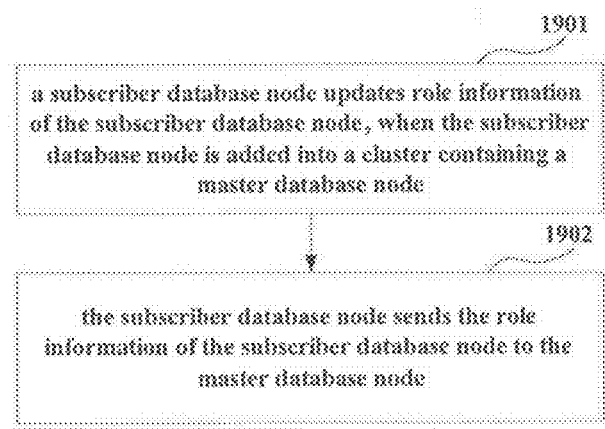
FIG. 19 is a flowchart of the method for optimizing index in accordance with an embodiment of the present invention.

FIG. 19 is a flowchart of the method for optimizing index in accordance with an embodiment of the present invention; as shown in FIG. 19, the method includes:

Step 1901, a subscriber database node updates role information of the subscriber database node, when the subscriber database node is added into a cluster containing a master database node;

Step 1902, the subscriber database node sends the role information of the subscriber database node to the master database node.

In another embodiment, indexes associated with role information are shipped to the subscriber database node from the master database node.

Figure 20:
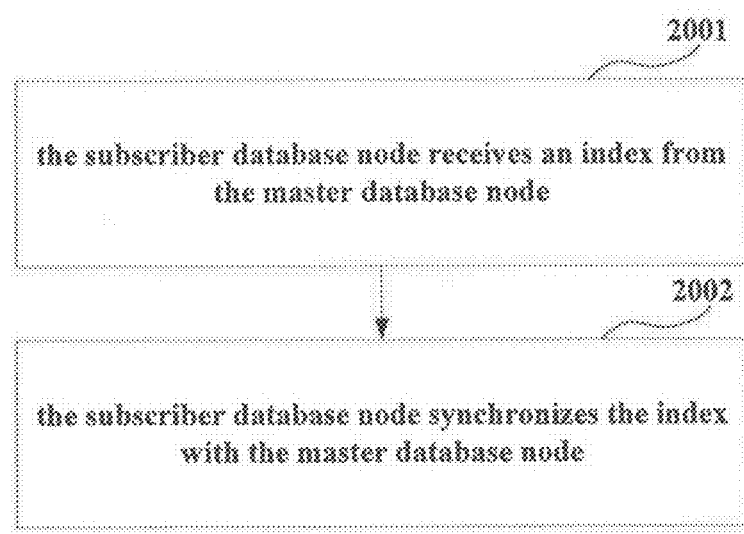
FIG. 20 is another flowchart of the method for optimizing index in accordance with an embodiment of the present invention.

FIG. 20 is another flowchart of the method for optimizing index in accordance with an embodiment of the present invention; as shown in FIG. 20, the method includes:

Step 2001, the subscriber database node receives an index from the master database node;

Step 2002, the subscriber database node synchronizes the index with the master database node.

In another embodiment, a record need to be inserted into a table associated with the index. Redo information may be shipped to the subscriber database node.

Figure 21:
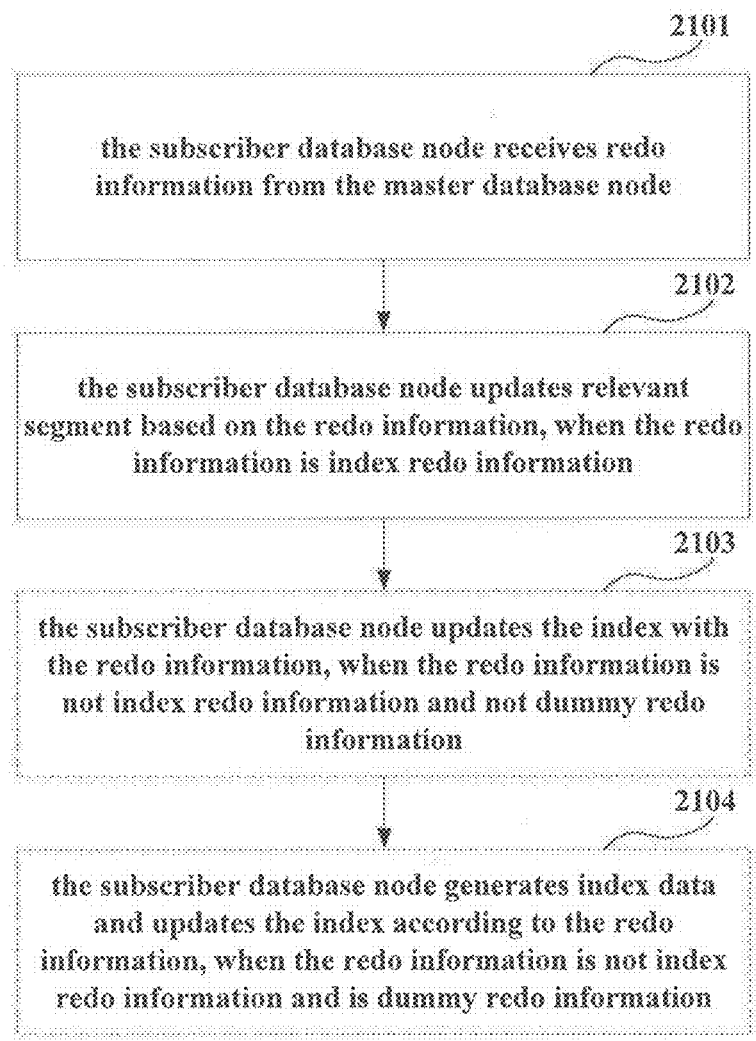
FIG. 21 is another flowchart of the method for optimizing index in accordance with an embodiment of the present invention.

FIG. 21 is another flowchart of the method for optimizing index in accordance with an embodiment of the present invention; as shown in FIG. 21, the method includes:

Step 2101, the subscriber database node receives redo information from the master database node;

Step 2102, the subscriber database node updates relevant segment based on the redo information, when the redo information is index redo information.

As shown in FIG. 21, the method may further include:

Step 2103, the subscriber database node updates the index with the redo information, when the redo information is not index redo information and not dummy redo information.

As shown in FIG. 21, the method may further include:

Step 2104, the subscriber database node generates index data and updates the index according to the redo information, when the redo information is not index redo information and is dummy redo information.

Figure 22:
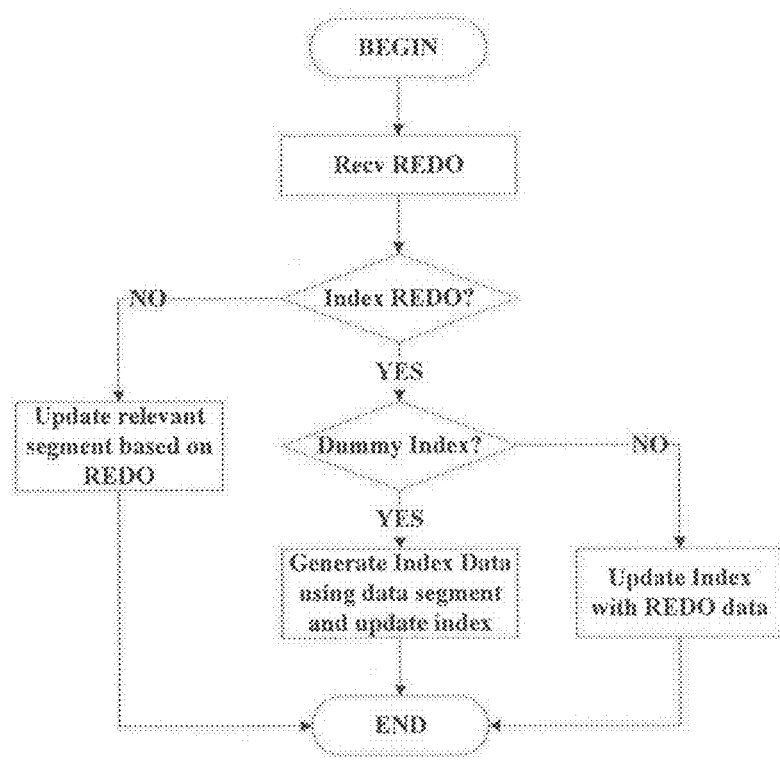
FIG. 22 is a schematic diagram showing an example of REDO replay in the subscriber database node.

FIG. 22 is a schematic diagram showing an example of REDO replay in the subscriber database node. As shown in FIG. 22, when the subscriber database node receives a REDO log from the master database node, the subscriber database node analyzes if the REDO is a dummy REDO log. If the REDO log is a dummy redo, then the subscriber database node retrieves the corresponding record from the table (data segment) and inserts it into the index. If the REDO log is not a dummy redo, the subscriber database node acts as per the REDO log information.

In another embodiment, role information of the subscriber database node may be updated.

Figure 23:
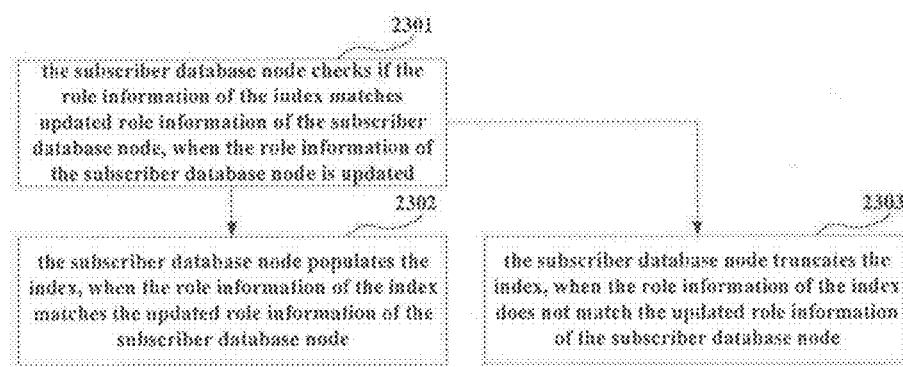
FIG. 23 is another flowchart of the method for optimizing index in accordance with an embodiment of the present invention.

FIG. 23 is another flowchart of the method for optimizing index in accordance with an embodiment of the present invention; as shown in FIG. 23, the method includes:

Step 2301, the subscriber database node checks if the role information of the index matches updated role information of the subscriber database node, when the role information of the subscriber database node is updated;

Step 2302, the subscriber database node populates the index, when the role information of the index matches the updated role information of the subscriber database node.

As shown in FIG. 23, the method may further include:

Step 2303, the subscriber database node truncates the index, when the role information of the index does not match the updated role information of the subscriber database node.

Figure 24:
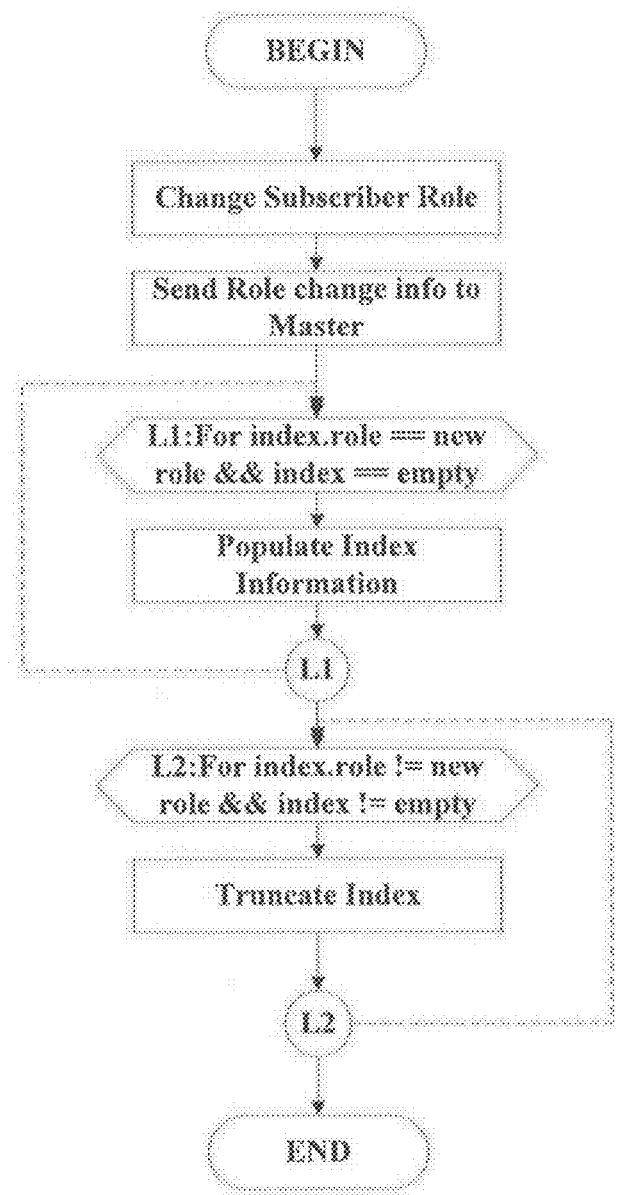
FIG. 24 is a schematic diagram showing an example of role change handling in the subscriber database node.

FIG. 24 is a schematic diagram showing an example of role change handling in the subscriber database node. As shown in FIG. 24, when a role of the subscriber database node is changed, then the data in the node should reflect the current role. This will involve populating new indexes and truncating (emptying) some irrelevant indexes.

As shown in FIG. 24, when a role is changed, the subscriber database node transfers this information to the master database node. Then it iterates through all available indexes and truncates all indexes which do not correspond to the current role. It also populates all empty indexes which correspond to the current role. This index updating is performed online which does not cause any service disruption.

It can be seen from the above embodiment that: indexes are associated with role information, while role information is associated with the master database node and the subscriber database node.

Furthermore, unnecessary indexes in the master database node and the subscriber database node are reduced while keeping the schema the same. Furthermore, unnecessary logs transmitted from the master database node to the subscriber database node are reduced.

Embodiment 3

This embodiment of the present invention further provides a master database node. This embodiment corresponds to the method of the above embodiment 1, and the same content will not be described.

Figure 25:
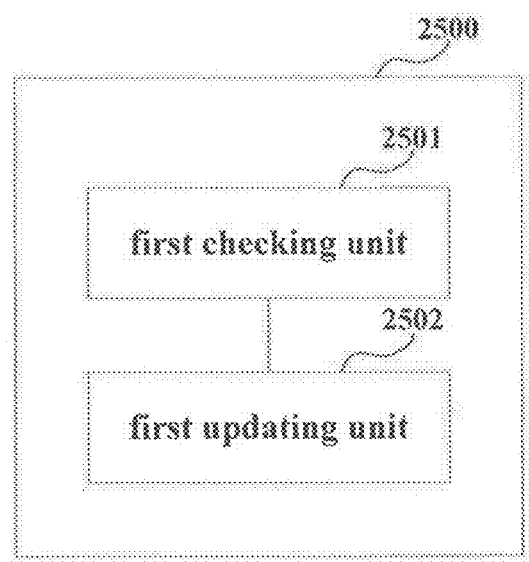
FIG. 25 is a schematic diagram of the master database node in accordance with an embodiment of the present invention.

FIG. 25 is a schematic diagram of the master database node in accordance with an embodiment of the present invention. As shown in FIG. 25, the master database node 2500 includes: a first checking unit 2501 and a first updating unit 2502. Other parts of the master database node can refer to the existing technology and not be described in the present application. However, it is not limited thereto, and particular implement way may be determined as actually required.

Where, the first checking unit 2501 is configured to check if role information of an index matches role information of the master database node, when the index is added into the master database node; the first updating unit 2502 is configured to update database information by using the index, when the role information of the index matches the role information of the master database node.

Figure 26:
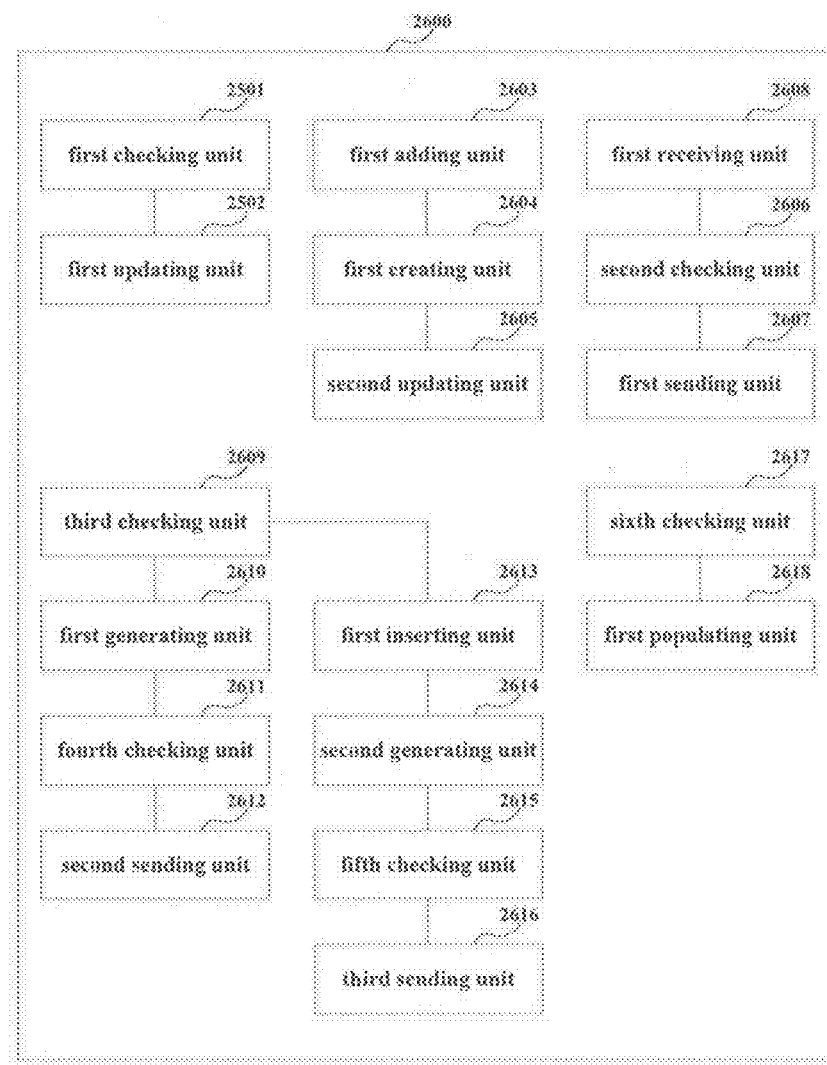
FIG. 26 is another schematic diagram of the master database node in accordance with an embodiment of the present invention.

FIG. 26 is another schematic diagram of the master database node in accordance with an embodiment of the present invention. As shown in FIG. 26, the master database node 2600 includes: a first checking unit 2501 and a first updating unit 2502, as described in above.

In another embodiment, as shown in FIG. 26, the master database node 2600 may further include: a first adding unit 2603, the first adding unit 2603 is configured to add the role information for the master database node.

As shown in FIG. 26, the master database node 2600 may further include: a first creating unit 2604 and a second updating unit 2605. Where, the first creating unit 2604 is configured to create the index by using Data Definition Language; the second updating unit 2605 is configured to update the index with the role information.

In another embodiment, as shown in FIG. 26, the master database node 2600 may further include: a second checking unit 2606 and a first sending unit 2607;

Where, the second checking unit 2606 is configured to check if the role information of the index matches the role information of a subscriber database node; the first sending unit 2607 is configured to send the index to the subscriber database node when the role information of the index matches the role information of the subscriber database node, so as to synchronize the index with the subscriber database node.

As shown in FIG. 26, the master database node 2600 may further include: a first receiving unit 2608, the first receiving unit 2608 is configured to receive the role information of the subscriber database node.

In another embodiment, as shown in FIG. 26, the master database node 2600 may further include: a third checking unit 2609 and a first generating unit 2610;

Where, the third checking unit 2609 is configured to check if the role information of the index matches the role information of the master database node, when a record need to be inserted into a table associated with the index; the first generating unit 2610 is configured to generate dummy redo information for the record when the role information of the index does not match the role information of the master database node.

As shown in FIG. 26, the master database node 2600 may further include: a fourth checking unit 2611 and a second sending unit 2612;

Where, the fourth checking unit 2611 is configured to check if the role information of the index matches the role information of a subscriber database node; the second sending unit 2612 is configured to send the dummy redo information to the subscriber database node when the role information of the index matches the role information of the subscriber database node.

As shown in FIG. 26, the master database node 2600 may further include: a first inserting unit 2613 and a second generating unit 2614;

Where, the first inserting unit 2613 is configured to insert the record into the table associated with the index; the second generating unit 2614 is configured to generate redo information for the record.

As shown in FIG. 26, the master database node 2600 may further include: a fifth checking unit 2615 and a third sending unit 2616;

Where, the fifth checking unit 2615 is configured to check if the role information of the index matches the role information of a subscriber database node; the third sending unit 2616 is configured to send the redo information to the subscriber database node when the role information of the index matches the role information of the subscriber database node.

In another embodiment, as shown in FIG. 26, the master database node 2600 may further include: a sixth checking unit 2617 and a first populating unit 2618;

Where, the sixth checking unit 2617 is configured to check if the role information of the index matches updated role information of the master database node, when the role information of the master database node is updated; the first populating unit 2618 is configured to populate the index when the role information of the index matches the updated role information of the master database node.

It can be seen from the above embodiment that: indexes are associated with role information, while role information is associated with the master database node and the subscriber database node.

Furthermore, unnecessary indexes in the master database node and the subscriber database node are reduced while keeping the schema the same. Furthermore, unnecessary logs transmitted from the master database node to the subscriber database node are reduced.

Embodiment 4

This embodiment of the present invention further provides a subscriber database node. This embodiment corresponds to the method of the above embodiment 2, and the same content will not be described.

Figure 27:
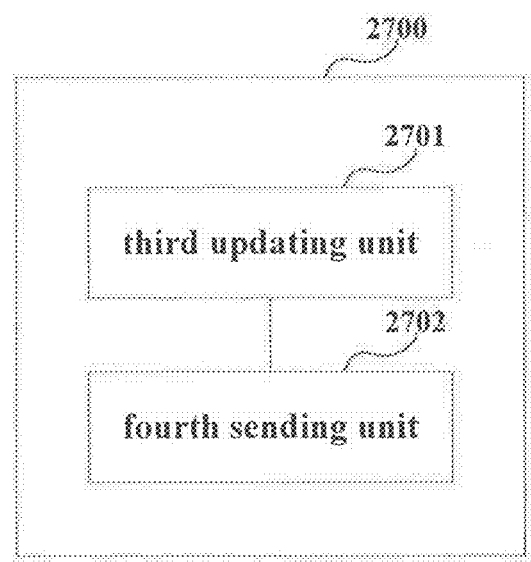
FIG. 27 is a schematic diagram of the subscriber database node in accordance with an embodiment of the present invention.

FIG. 27 is a schematic diagram of the subscriber database node in accordance with an embodiment of the present invention. As shown in FIG. 27, the subscriber database node 2700 includes: a third updating unit 2701 and a fourth sending unit 2702. Other parts of the subscriber database node can refer to the existing technology and not be described in the present application. However, it is not limited thereto, and particular implement way may be determined as actually required.

Where, the third updating unit 2701 is configured to update role information of the subscriber database node when the subscriber database node is added into a cluster containing a master database node; the fourth sending unit 2702 is configured to send the role information of the subscriber database node to the master database node.

Figure 28:
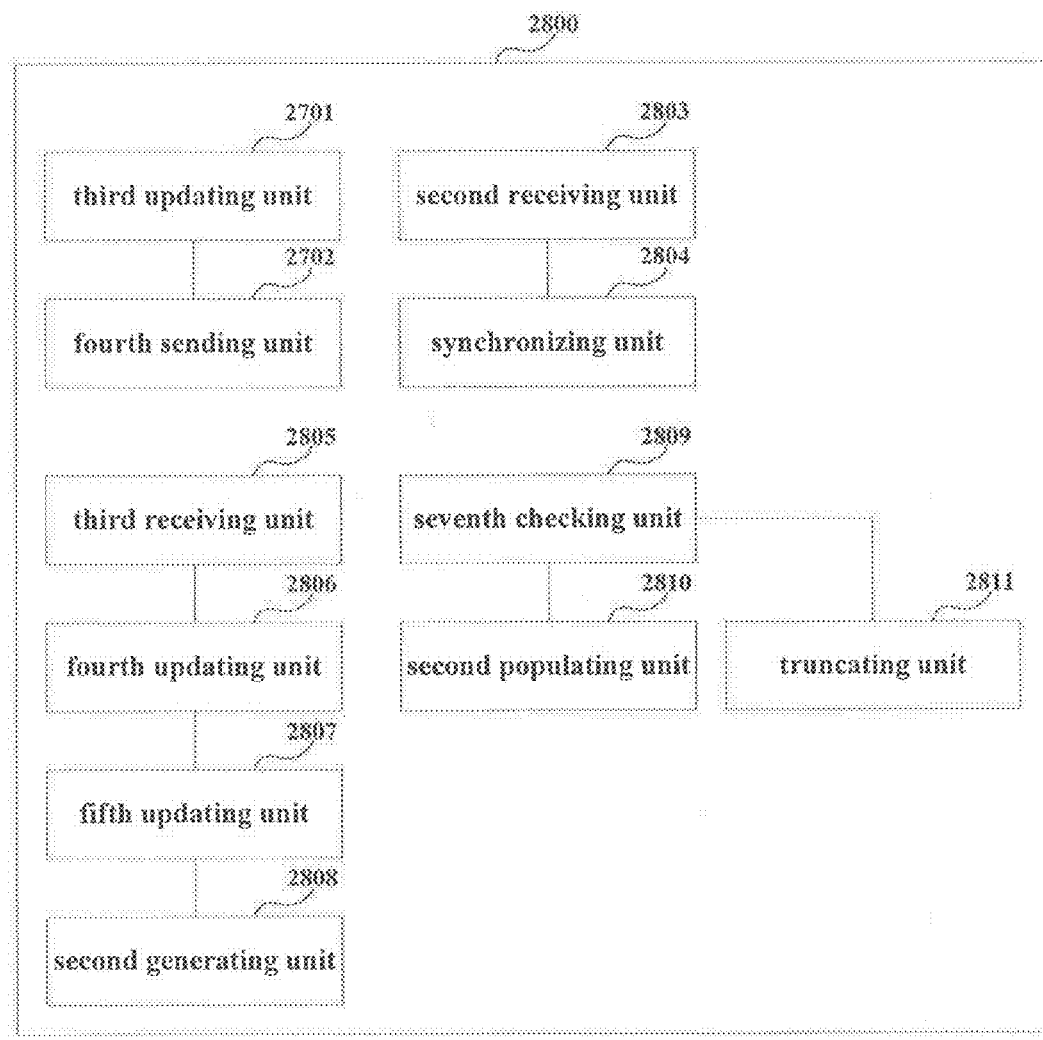
FIG. 28 is another schematic diagram of the subscriber database node in accordance with an embodiment of the present invention.

FIG. 28 is another schematic diagram of the subscriber database node in accordance with an embodiment of the present invention. As shown in FIG. 28, the subscriber database node 2800 includes: a third updating unit 2701 and a fourth sending unit 2702, as described in above.

In another embodiment, as shown in FIG. 28, the subscriber database node 2800 may further include: a second receiving unit 2803 and a synchronizing unit 2804;

Where, the second receiving unit 2803 is configured to receive an index from the master database node; the synchronizing unit 2804 is configured to synchronize the index with the master database node.

In another embodiment, as shown in FIG. 28, the subscriber database node 2800 may further include: a third receiving unit 2805 and a fourth updating unit 2806;

Where, the third receiving unit 2805 is configured to receive redo information from the master database node; the fourth updating unit 2806 is configured to update relevant segment based on the redo information, when the redo information is index redo information.

As shown in FIG. 28, the subscriber database node 2800 may further include: a fifth updating unit 2807, the fifth updating unit 2807 is configured to update the index with the redo information, when the redo information is not index redo information and not dummy redo information.

As shown in FIG. 28, the subscriber database node 2800 may further include: a second generating unit 2808, the second generating unit 2808 is configured to generate index data and update the index according to the redo information, when the redo information is not index redo information and is dummy redo information.

In another embodiment, as shown in FIG. 28, the subscriber database node 2800 may further include: a seventh checking unit 2809 and a second populating unit 2810;

Where, the seventh checking unit 2809 is configured to check if the role information of the index matches updated role information of the subscriber database node, when the role information of the subscriber database node is updated; the second populating unit 2810 is configured to populate the index when the role information of the index matches the updated role information of the subscriber database node.

As shown in FIG. 28, the subscriber database node 2800 may further include: a truncating unit 2811, the truncating unit 2811 is configured to truncate the index, when the role information of the index does not match the updated role information of the subscriber database node.

It can be seen from the above embodiment that: indexes are associated with role information, while role information is associated with the master database node and the subscriber database node.

Furthermore, unnecessary indexes in the master database node and the subscriber database node are reduced while keeping the schema the same. Furthermore, unnecessary logs transmitted from the master database node to the subscriber database node are reduced.

It should be understood that each of the parts of the present invention may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a Programmable Gate Array (PGA), and a field programmable gate array (FPGA), etc.

The description or blocks in the flowcharts or of any process or method in other manners may be understood as being indicative of comprising one or more modules, segments or parts for realizing the codes of executable instructions of the steps in specific logic functions or processes, and that the scope of the embodiments of the present invention comprise other implementations, wherein the functions may be executed in manners different from those shown or discussed, including executing the functions according to the related functions in a substantially simultaneous manner or in a reverse order, which should be understood by those skilled in the art to which the present invention pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus.

The above literal description and drawings show various features of the present invention. It should be understood that those skilled in the art may prepare appropriate computer codes to carry out each of the steps and processes as described above and shown in the drawings. It should be also understood that all the terminals, computers, servers, and networks may be any type, and the computer codes may be prepared according to the disclosure to carry out the present invention by using the apparatus.

Particular embodiments of the present invention have been disclosed herein. Those skilled in the art will readily recognize that the present invention is applicable in other environments. In practice, there exist many embodiments and implementations. The appended claims are by no means intended to limit the scope of the present invention to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular embodiment has been shown and the present invention has been described, it is obvious that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present invention with respect to structure. Furthermore, although the a particular feature of the present invention is described with respect to only one or more of the illustrated embodiments, such a feature may be combined with one or more other features of other embodiments as desired and in consideration of advantageous aspects of any given or particular application.

What is claimed is:

1. A method for optimizing an index, the method comprising:
   checking, by a master database node, whether role information of an index matches the role information of the master database node, in response to a record needing insertion into a table associated with the index;
   generating dummy redo information for the record in response to the role information of the index not match matching the role information of the master database node;
   checking, by the master database node, whether the role information of the index matches role information of a subscriber database node;
   sending, by the master database node, the dummy redo information to the subscriber database node in response to the role information of the index matches matching the role information of the subscriber database node;
   checking, by the master database node, whether the role information of the index matches role information of the master database node, in response to the index being added into the master database node; and
   updating, by the master database node, database information using the index in response to the role information of the index matching the role information of the master database node.

2. The method as claimed in claim 1, wherein before checking whether role information of the index matches role information of the master database node, the method further comprises:
   adding the role information for the master database node.

3. The method as claimed in claim 1, wherein before checking whether role information of an index matches role information of the master database node, the method further comprises:
   creating the index using Data Definition Language; and
   updating the index with the role information.

4. The method as claimed in claim 1, wherein the method further comprises:
   sending, by the master database node, the index to the subscriber database node in response to the role information of the index matching the role information of the subscriber database node, so as to synchronize the index with the subscriber database node.

5. The method as claimed in claim 4, wherein the method further comprises:
   receiving, by the master database node, the role information of the subscriber database node.

6. The method as claimed in claim 1, wherein in response to the role information of the index matches the role information of the master database node, the method further comprises:
   inserting, by the master database node, the record into the table associated with the index; and
   generating redo information for the record.

7. The method as claimed in claim 6, wherein the method further comprises:
   sending, by the master database node, the redo information to the subscriber database node in response to the role information of the index matching the role information of the subscriber database node.

8. The method as claimed in claim 1, wherein the method further comprises:
checking, by the master database node, whether the role information of the index matches updated role information of the master database node, in response to the role information of the master database node being updated; and
populating, by the master database node, the index in response to the role information of the index matching the updated role information of the master database node.

9. A method for optimizing an index, the method comprising:
updating, by a subscriber database node, role information of the subscriber database node in response to the subscriber database node being added into a cluster containing a master database node;
checking, by the subscriber database node, whether role information of the index matches the updated role information of the subscriber database node, in response to the role information of the subscriber database node being updated;
populating, by the subscriber database node, the index in response to the role information of the index matching the updated role information of the subscriber database node; and
sending, by the subscriber database node, the role information of the subscriber database node to the master database node.

10. The method as claimed in claim 9, wherein the method further comprises:
receiving, by the subscriber database node, an index from the master database node; and
synchronizing the index with the master database node.

11. The method as claimed in claim 9, wherein the method further comprises:
receiving, by the subscriber database node, redo information from the master database node;
updating a relevant segment based on the redo information, in response to the redo information being index redo information.

12. The method as claimed in claim 11, wherein the method further comprises:
updating the index with the redo information, in response to the redo information not being index redo information and not being dummy redo information.

13. The method as claimed in claim 11, wherein the method further comprises:
generating index data and updating the index according to the redo information, in response to the redo information not being index redo information and being dummy redo information.

14. The method as claimed in claim 9, wherein the method further comprises:

truncating, by the subscriber database node, the index in response to the role information of the index not matching the updated role information of the subscriber database node.

15. A master database node, comprising:
a processor;
a memory storing computer program which when executed by the processor causes the processor to perform the following steps:
checking whether role information of an index matches role information of the master database node, in response to a record needing insertion into a table associated with the index;
generating dummy redo information for the record in response to the role information of the index not match matching the role information of the master database node;
checking whether the role information of the index matches role information of a subscriber database node;
sending the dummy redo information to the subscriber database node in response to the role information of the index matching the role information of the subscriber database node;
checking whether role information of the index matches role information of the master database node, in response to the index being added into the master database node; and
updating database information using the index in response to the role information of the index matching the role information of the master database node.

16. The master database node according to claim 15, wherein the computer program further causes the processor to perform the following steps:
sending the index to the subscriber database node in response to the role information of the index matching the role information of the subscriber database node, so as to synchronize the index with the subscriber database node.

17. A subscriber database node, comprising:
a processor;
a memory storing a computer program which when executed by the processor causes the processor to perform the following steps:
updating role information of the subscriber database node in response to the subscriber database node being added into a cluster containing a master database node;
checking whether role information of an index matches the updated role information of the subscriber database node, in response to the role information of the subscriber database node being updated;
populating, by the subscriber database node, the index in response to the role information of the index matching the updated role information of the subscriber database node; and
sending the role information of the subscriber database node to the master database node.

* * * * *